United States Patent
Collins et al.

(10) Patent No.: US 10,288,718 B2
(45) Date of Patent: May 14, 2019

(54) SYSTEM AND METHOD FOR DETECTION OF LOADING LOCATION

(71) Applicant: Caterpillar Inc., Peoria, IL (US)

(72) Inventors: Darryl Victor Collins, Brisbane (AU); Michael Siemer, Brisbane (AU)

(73) Assignee: Caterpillar Inc., Deerfield, IL (US)

(*) Notice: Subject to any disclaimer, the term of this patent is extended or adjusted under 35 U.S.C. 154(b) by 92 days.

(21) Appl. No.: 15/682,810

(22) Filed: Aug. 22, 2017

(65) Prior Publication Data

US 2019/0064316 A1 Feb. 28, 2019

(51) Int. Cl.
*G01S 5/16* (2006.01)
*B65G 67/00* (2006.01)
*G01G 19/08* (2006.01)

(52) U.S. Cl.
CPC ............... *G01S 5/16* (2013.01); *B65G 67/00* (2013.01); *G01G 19/08* (2013.01); *B60G 2300/026* (2013.01); *B60G 2600/0422* (2013.01)

(58) Field of Classification Search
CPC .......... G01S 5/16; B65G 67/00; G01G 19/08; B60G 2600/0422; B60G 2300/026
USPC .......................................................... 701/50
See application file for complete search history.

(56) References Cited

U.S. PATENT DOCUMENTS

| | | | | |
|---|---|---|---|---|
| 5,416,706 A | * | 5/1995 | Hagenbuch | G01G 19/08 177/136 |
| 5,631,832 A | * | 5/1997 | Hagenbuch | G01G 19/08 340/989 |
| 8,903,612 B2 | | 12/2014 | Tejeda et al. | |
| 9,302,859 B2 | | 4/2016 | Vesterdal et al. | |
| 9,568,322 B2 | | 2/2017 | Sugihara et al. | |
| 2012/0130599 A1 | * | 5/2012 | Faivre | E02F 9/2033 701/50 |
| 2016/0069675 A1 | * | 3/2016 | Bando | G01C 21/16 701/519 |
| 2018/0066415 A1 | * | 3/2018 | Friend | E02F 9/2054 |

* cited by examiner

*Primary Examiner* — Muhammad Shafi

(57) ABSTRACT

A control system for determining a location of loading of a machine operating at a worksite is provided. The control system includes a controller coupled to a dump switch. The controller receives a dump signal and velocity data associated with the machine. The velocity data includes a speed of the machine at various positions along a route followed by the machine from a first dump location to a second dump location. The controller identifies the first dump location, the second dump location, and a plurality of stops made along the route. The controller estimates, a first distance and a second distance between the stop and each of the dump locations. The controller estimates a baseline distance between the dump locations and assigns a weighting factor to the stops. Further, the controller determines a load location from the plurality of stops based on the assigned weighting factors.

20 Claims, 6 Drawing Sheets

SYSTEM AND METHOD FOR DETECTION OF LOADING LOCATION

TECHNICAL FIELD

The present disclosure relates to a machine operating at a worksite, and more particularly to a system and method for detection of a location of loading of the machine.

BACKGROUND

Machines, such as mining trucks, operate at a worksite to transport material from one location to another. The machine may tend to travel backwards and forwards between a load point and dump or park-up points along a route while mining is underway.

More specifically, during a load-haul-dump cycle, the machine travels from the dump point to the load point, stops for some time at the load point until loading is complete and then travels to the same dump point or a new dump point. It may be required to know a location of the load point for production recording and tracking purposes.

The route taken by the machine from the dump point to the load point and back from the load point to the dump point may either be the same or may vary based on the location of the final dump point. Further, the machine may make stops along the route for other reasons other than for loading, for example, the machine may need to stop to make way for other machines, and so on. In some situations, the load point may not be surveyed, making it challenging to identify the location of the load point. Further, some of the machines may not include payload sensors, due to additional costs associated with the installation of such sensors. Hence, it may be difficult to identify the load points at the worksite.

U.S. Pat. No. 9,302,859 describes a system for determining vehicle loading and unloading. The system comprises an acceleration detector provided on a vehicle, a location detector for detecting the location of the vehicle and a processor that receives information detected by the acceleration detector and location detector and determines whether the detected acceleration is due to vehicle loading, unloading or travel, based on the received information. A timer may be started, when vehicle loading or unloading is determined, such that the amount of time spent loading or unloading the vehicle may be obtained. Also, a condition of a traveled surface may be determined based on information received from the acceleration detector and location detector.

SUMMARY OF THE DISCLOSURE

In one aspect of the present disclosure, a control system for determining a location of loading of a machine operating at a worksite is provided. The control system includes a dump switch associated with the machine. The dump switch is configured to generate a dump signal indicative of a start of a dump operation. The control system also includes a controller coupled to the dump switch. The controller is configured to receive the dump signal indicative of the start of the dump operation. The controller is configured to receive velocity data associated with the machine. The velocity data includes a speed of the machine at various positions along a route followed by the machine from a first dump location to a second dump location. The controller is configured to identify the first dump location and the second dump location along the route based on the received dump signal. The controller is configured to identify a plurality of stops made by the machine along the route based on the velocity data. The controller is configured to estimate, for each of the plurality of stops, a first distance between the stop and the first dump location. The controller is configured to estimate, for each of the plurality of stops, a second distance between the stop and the second dump location. The controller is configured to estimate a baseline distance between the first dump location and the second dump location. The controller is configured to assign a weighting factor to each of the plurality of stops based on the estimated first distance, the second distance, and baseline distance. Further, the controller is configured to determine a load location from the plurality of stops along the route based on the assigned weighting factors.

In another aspect of the present disclosure, a method for determining a location of loading of a machine operating at a worksite is provided. The method includes receiving, by a controller, a dump signal indicative of a start of a dump operation from a dump switch associated with the machine. The method includes receiving, by the controller, velocity data associated with the machine. The velocity data includes a speed of the machine at various positions along a route followed by the machine from a first dump location to a second dump location. The method includes identifying, by the controller, the first dump location and the second dump location along the route based on the received dump signal. The method includes identifying, by the controller, a plurality of stops made by the machine along the route based on the velocity data. The method includes estimating, by the controller, for each of the plurality of stops, a first distance between the stop and the first dump location. The method includes estimating, by the controller, for each of the plurality of stops, a second distance between the stop and the second dump location. The method includes estimating, by the controller, a baseline distance between the first dump location and the second dump location. The method includes assigning, by the controller, a weighting factor to each of the plurality of stops based on the estimated first distance, the second distance, and baseline distance. The method includes determining, by the controller, a load location from the plurality of stops along the route based on the assigned weighting factors.

In yet another aspect of the present disclosure, a non-transitory computer program product having computer-executable instructions stored thereon is provided. The computer program product if executed by a computer based system capable of determining a location of loading of a machine operating at a worksite. The computer program product causes the computer based system to be capable of performing operations including receiving, by a controller, a dump signal indicative of a start of a dump operation from a dump switch associated with the machine. The computer program product causes the computer based system to be capable of performing operations including receiving, by the controller, velocity data associated with the machine, the velocity data including a speed of the machine at various positions along a route followed by the machine from a first dump location to a second dump location. The computer program product causes the computer based system to be capable of performing operations including identifying, by the controller, the first dump location and the second dump location along the route based on the received dump signal. The computer program product causes the computer based system to be capable of performing operations including identifying, by the controller, a plurality of stops made by the machine along the route based on the velocity data. The computer program product causes the computer based system to be capable of performing operations including estimating, by the controller, for each of the plurality of stops, a first distance between the stop and the first dump location. The computer program product causes the computer based system to be capable of performing operations including estimating, by the controller, for each of the plurality of stops, a second distance between the stop and the second dump location. The computer program product causes the computer based system to be capable of performing operations including estimating, by the controller, a baseline distance between the first dump location and the second dump location. The computer program product causes the computer based system to be capable of performing operations including assigning, by the controller, a weighting factor to each of the plurality of stops based on the estimated first distance, the second distance, and baseline distance. The computer program product causes the computer based system to be capable of performing operations including determining, by the controller, a load location from the plurality of stops along the route based on the assigned weighting factors.

Other features and aspects of this disclosure will be apparent from the following description and the accompanying drawings.

DETAILED DESCRIPTION

Wherever possible, the same reference numbers will be used throughout the drawings to refer to the same or the like parts. Also, corresponding or similar reference numbers will be used throughout the drawings to refer to the same or corresponding parts.

Figure 1:
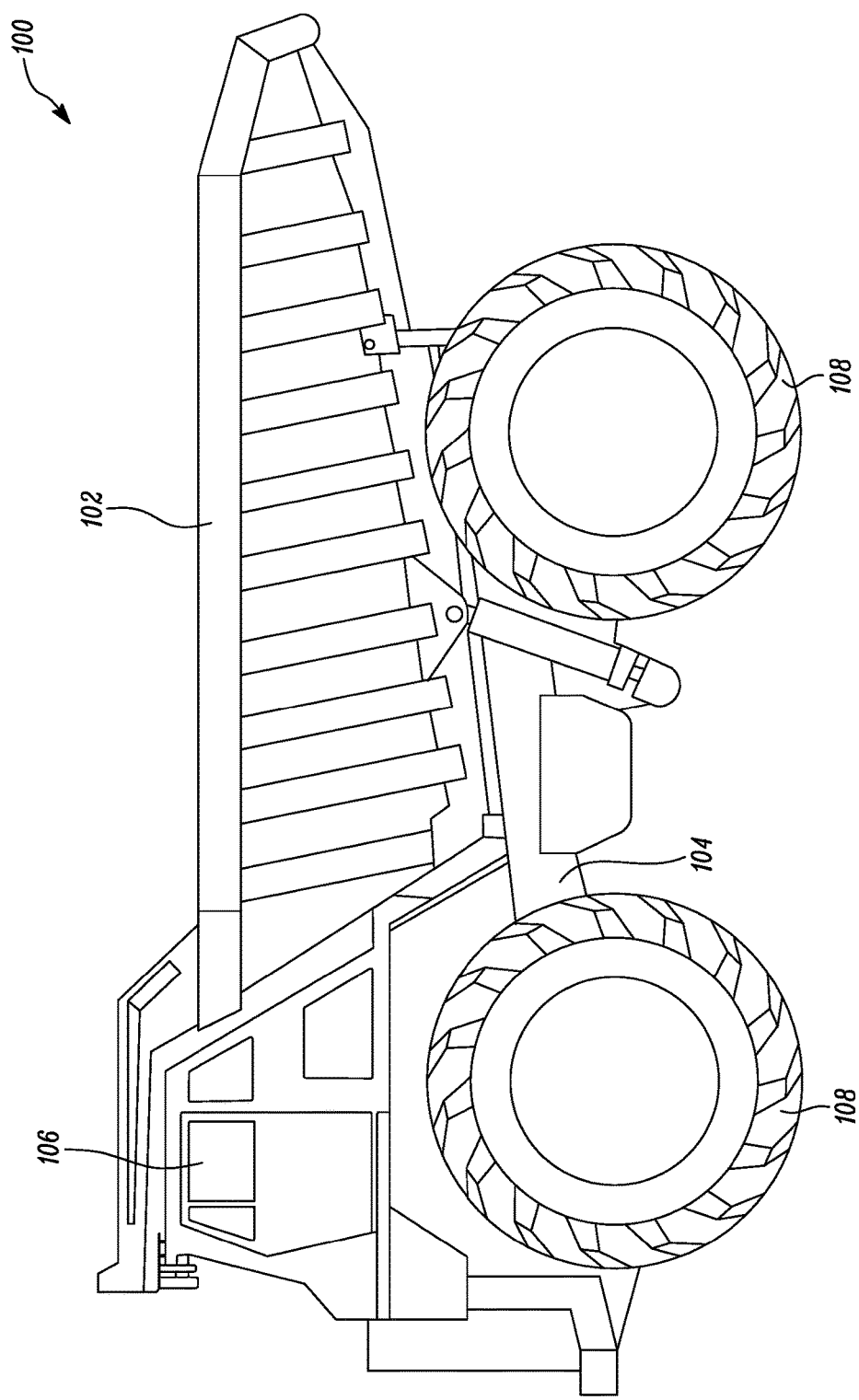
FIG. 1 is a side view of an exemplary machine, according to various concepts of the present disclosure.

Referring to FIG. 1, an exemplary machine 100 is illustrated. The machine 100 is embodied as a mining truck operating at a worksite. Although the machine 100 is described as the mining truck, alternatively, the machine 100 may be embodied as wheel loader, dozers, scrapers, graders, and so on.

The machine 100 includes a truck body 102 pivotably attached to a frame 104 of the machine 100. The machine 100 has an operator cabin 106 housing controls to operate the machine 100. Wheels 108 are provided on the machine 100 for mobility. During operation, the truck body 102 pivots between a first position and a second position. This movement of truck body 102 is controlled by one or more actuators.

The truck body 102 is configured to be loaded with material, and the machine 100 transports the material from one location to another at the worksite. For example, the truck body 102 may be loaded with the material when the truck body 102 is in the first position. After moving to the dump location, the truck body 102 is actuated to move to the second position for dumping the material.

Figure 2:
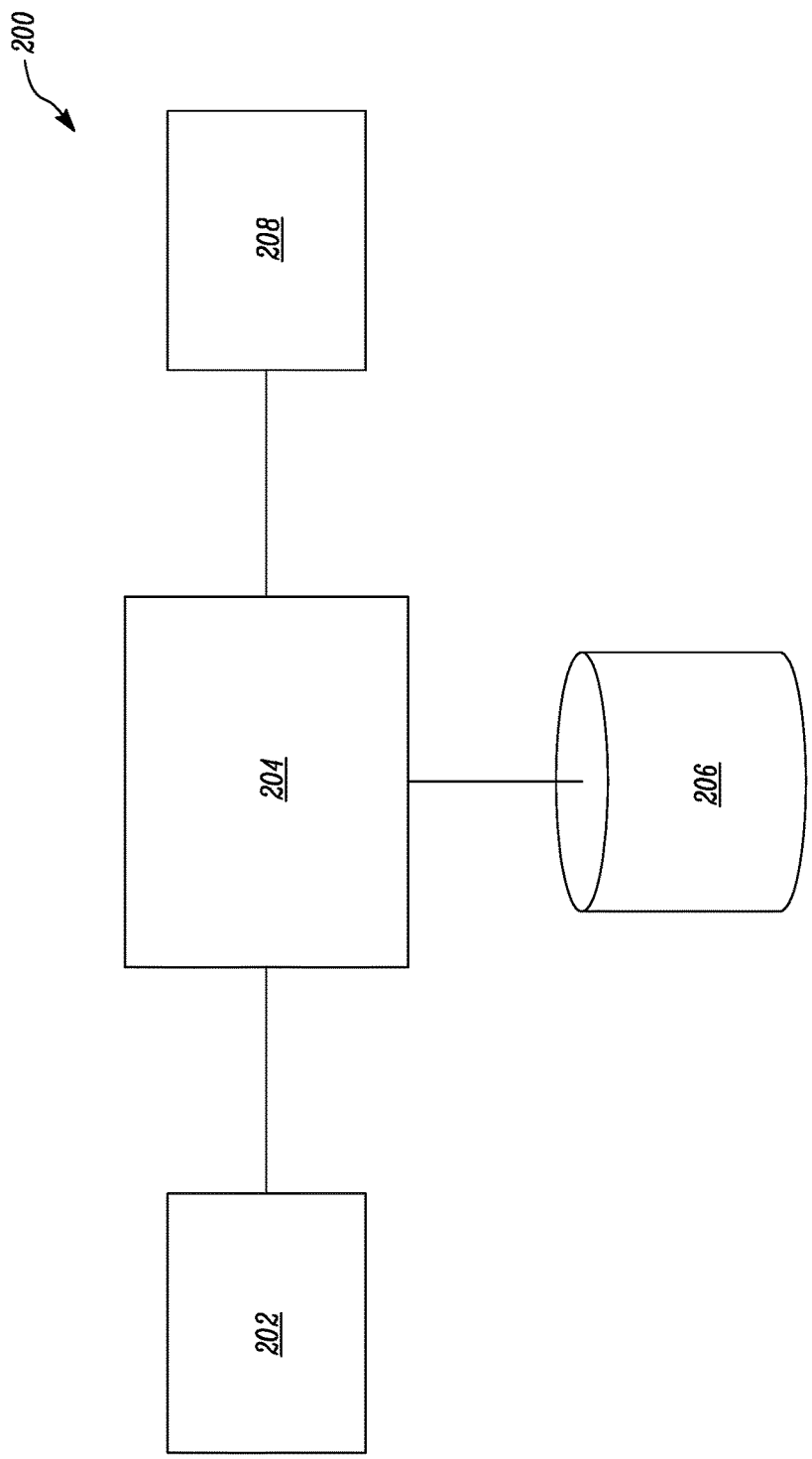
FIG. 2 is a block diagram of a control system associated with the machine of FIG. 1, according to various concepts of the present disclosure.

The present disclosure is related to a control system 200 that is configured to determine a location of loading of the machine 100 in a load-haul-dump cycle. Referring to FIG. 2, the control system 200 includes a dump switch 202. The dump switch 202 is configured to generate a dump signal indicative of a start of a dump operation. The dump switch 202 may be provided within the operator cabin 106, so that an operator seated within the operator cabin 106 may easily access and activate the dump switch 202. Activation of the dump switch 202 may cause corresponding movement of the actuators associated with the truck body 102, causing the truck body 102 to be raised and tilted. The dump switch 202 is coupled to a controller 204. The controller 204 receives the dump signal from the dump switch 202 when activated by the operator, indicating the start of the dump operation. The controller 204 is present on-board the machine 100. Alternatively, the controller 204 may be present at a remote location.

Further, the controller 204 is communicably coupled to a position detection system (not shown) such as, a GPS system present on-board the machine 100. The position detection system generates a signal indicative of a current position of the machine 100 relative to the worksite. The controller 204 receives this signal and is aware of the position of the machine 100 relative to the worksite.

The controller 204 is also coupled to a database 206. The database 206 includes any known data storage medium or repository. Further, the database 206 may be an online or offline storage medium. The controller 204 retrieves data from the database 206 using any known wireless communication network. In one example, the controller 204 may access the data stored in the database 206 through a web application. The database 206 is configured to store velocity reports associated with the machine 100. More particularly, the velocity reports contain information related to a speed of the machine 100 at various positions along a route followed by the machine 100 from a first dump location to a second dump location. In one example, the velocity reports are GPS doppler velocity reports.

Alternatively, other ground speed indication sensors that are present on the machine 100 may be used to determine the speed of the machine 100 at the different positions along the route. For example, wheel and or axle rotation sensors may be used to determine the ground speed of the machine 100 along the route. This information from the sensors may be fused with the data from the velocity reports to serve as a check, ensuring that the ground speed of the machine 100 has been determined accurately by the system. In another example, data from an on-board accelerometer and gyroscope may be combined with the data from the position detection system of the machine 100 to determine the speed of the machine 100 at the various positions along the route.

The controller 204 receives the dump signal and the velocity data associated with the machine 100 to identify a load location from a number of stops made by the machine 100 along the route. The controller 204 may analyze the information received from the dump switch 202 and the velocity data for determination of the location at which a loading operation occurred after completion of the dump-load-dump cycle. The controller 204 analyzes the route information and performs a number of steps to identify the load location. These steps will be explained in detail connection with an exemplary route and exemplary velocity data shown in FIGS. 3 and 4 respectively. It should be noted that the distances may be normalized to plot on the same scale in FIG. 4.

Based on the velocity reports and the data from the position detection system, the controller 204 is aware of the route 300 followed by the machine 100. The distance traveled by the machine 100 may be computed by the controller 204 to sufficient accuracy by accumulating the GPS doppler speed and time measurements. The GPS readings may be available with sufficient frequency of nominally 1 reading per second.

Figure 3:
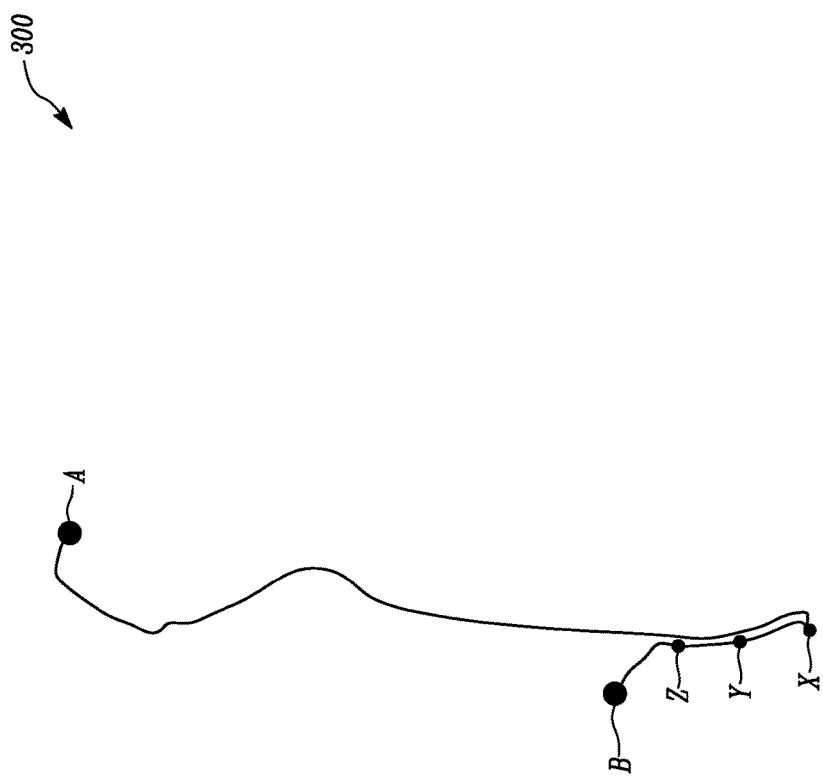
FIG. 3 is an exemplary route taken by the machine at a worksite, the route including a first dump location, a second dump location and a number of stops along the route, according to various concepts of the present disclosure.

The controller 204 identifies the first dump location A and the second dump location B based on the activation of the dump switch 202 at these locations. It should be noted that the route 300 illustrated in FIG. 3 is an exemplary route in which the first dump location A is different from the second dump location B. In another example, the machine 100 may initially start at the first dump location A travel along the route 300 to the load location and return to the same dump location A.

Further, based on the velocity data, the controller 204 may determine a number of stops, for example X, Y, and Z, made by the machine 100 while travelling along the route 300 between the first dump location A and the second dump location B. More particularly, the controller 204 identifies the stops X, Y, and Z based on the speed of the machine 100 dropping below a predetermined threshold for a given time interval.

Figure 4:
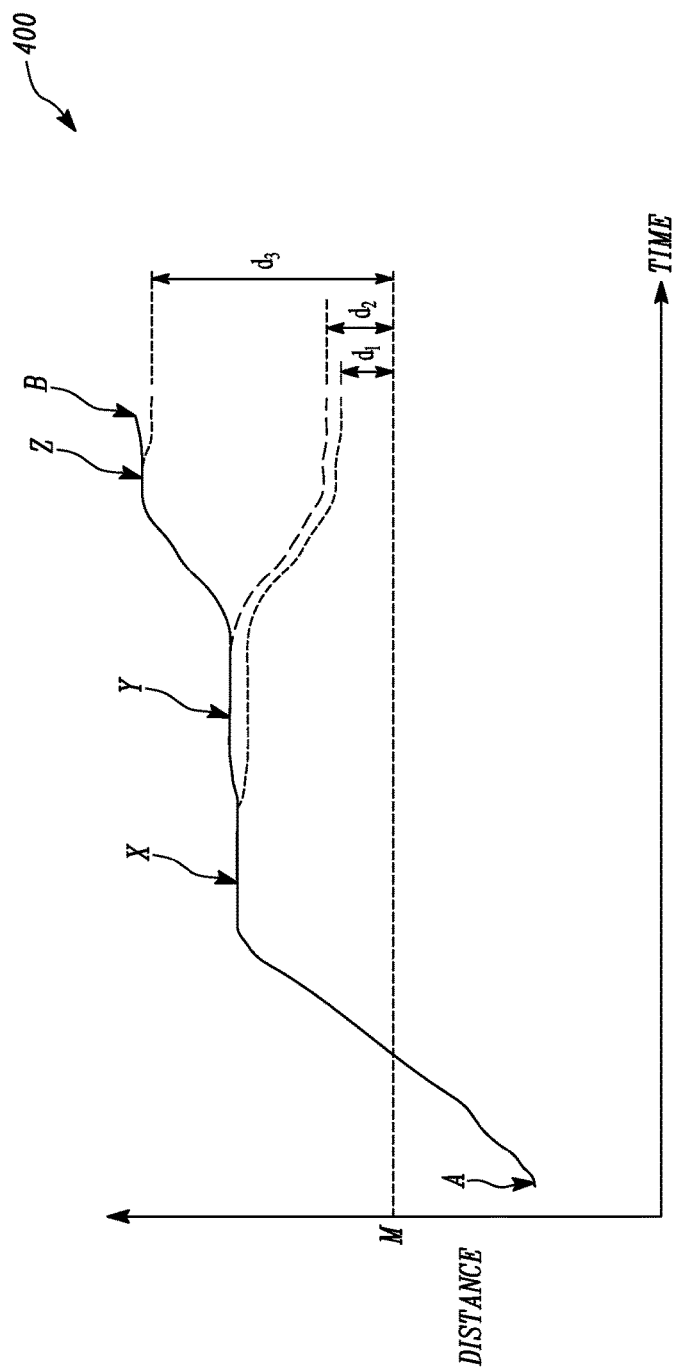
FIG. 4 is an exemplary graph showing a distance traveled by the machine along the route depicted as a function of time, according to various concepts of the present disclosure.

Referring to FIG. 4, the distance covered by the machine 100 from the first dump location A to the second dump location B is shown as a function of time. An exemplary graph 400 shows that the machine 100 has made three stops, that is at X, Y and Z along the route 300. The stops X, Y, and Z are represented as plateaus in the graph 400, since the machine 100 is at a standstill position and does not cover any distance during the given intervals.

For each of the stops X, Y and Z, the controller 204 determines a first distance as the distance between the respective stop and the first dump location A. Also, the controller 204 also determines a second distance for each of the stops X, Y, and Z. The second distance is the distance between the respective stop and the second dump location B. The controller 204 determines a baseline distance (represented as M in the graph 400) between the first dump location A and the second dump location B. In the given example, since the first and second dump locations A, B are at different positions on the worksite, the baseline distance M between the first and second dump locations A, B is non-zero and approximately given by a linear distance between the first and second dump locations A, B. In another example, when the machine 100 returns to its initial dump location, the first and second dump locations coincide, causing the baseline distance to be approximately zero.

Referring to FIG. 4, the controller 204 identifies the stops X, Y and Z at which the speed of the machine 100 drops below the predetermined threshold. The controller 204 then inverts a curve (represented by dashed lines in the graph 400) of the distance traveled by the machine 100 for each of the stops X, Y, and Z for determining the first and second distances. The inverted curves represent negated distances of paths back to the second dump location B from each of the respective stops and is indicative of the net distance traveled by the machine 100 from that given stop.

The controller 204 operates on the working principle that at the loading location the difference between the distance traveled towards the stop from the first dump location A, that is the first distance, and the distance traveled from the stop towards the second dump location B, that is the second distance, should be approximately equal to the net distance between the first and second dump locations A, B, that is the baseline distance. However, the first and second distances are traveled along the route 300 and the baseline distance is most easily computed as a linear distance between the first and second dump locations A, B, the distances may not equate exactly. The controller 204 implements an algorithm that uses a heuristic approach to combine candidate paths for the dump-load-dump cycle weighted by how well they approximate the above described equality.

The controller 204 assigns a weighting factor to each of the stops X, Y, and Z based on a closeness of the given stop to the baseline distance M. The controller 204 checks for a match or closeness between a difference in the first distance traveled from the first dump location A to the given stop and the second distance traveled from the given stop to the second dump location B, with respect to the baseline distance M. A higher value of the weighting factor is assigned to the given stop which is closer or matches the baseline distance M. In other words, the controller 204 assigns the weighting factor to each of the stops X, Y and Z such that the controller 204 computes an inverse of a discrepancy between a measured net distance (that is a difference between the first and second distances) and the linear distance between the first and second dump locations A, B (that is the baseline distance M).

In the given example, a normalized baseline distance M between the first and second dump locations A, B is approximately 0.5 m. Hence, each of the inverted curves associated with the respective stops X, Y and Z are evaluated based on their respective closeness to the baseline distance M and are represented as $d_1$, $d_2$, and $d_3$ respectively in the graph 400. As can be seen, $d_1$ is closest to the baseline distance and hence stop X is assigned the highest weighting factor, while stop Z is farthest distance $d_3$ from the baseline distance M and is assigned the lowest weighting factor by the controller 204.

The controller 204 then performs a number of mathematical calculations for each curve or candidate path associated with the respective stops X, Y and Z to determine a probability of the loading operation of the machine 100 at the respective stops. The controller 204 multiples the assigned weighting factor with the curve for each stop. The controller 204 then combines the weighted curves by taking a sum of each of the curves to form a resultant curve. The controller 204 may also normalize the resultant curve so that a maximum value of the resultant curve is 1.

The resultant curve combines the candidate paths (that is curve of X, Y, and Z respectively) based on different loading hypotheses weighted on their potential accuracy. The resultant curve may be interpreted a belief that the machine 100 is being loaded at any point in time. The controller 204 may select a suitable threshold, for example 0.99 or 1, and times and corresponding locations at which the resultant curve exceeds the threshold may be determined by the controller 204 as a best estimate of when and where the loading operation occurred. Since this measure is normalized to have a value between 0 and 1, it can be treated as an apriori probability estimate for further use in Bayesian refinement techniques when other data sources are available for inclusion in the determination of the load location.

Based on a time interval corresponding to the maximization of the resultant curve, the controller 204 determines the start of the loading operation and the end of the loading operation. The controller 204 detects that the loading operation has taken place within this time interval. Further, using the velocity data, the controller 204 may determine the corresponding load location of the machine 100 relative to the worksite based on the known loading time interval and position information of the machine 100 along the route 300.

For example, the start of the loading operation may be determined by the controller 204 as the time at which the resultant curve reaches 1 and the end of the loading operation may be determined as the time at which the resultant curve drops below 1. The controller 204 determines that the location of the machine 100 at either of these times is the load location of the machine 100. In the given example, the resultant curve is maximum in the time interval corresponding to the stop X. Hence, the controller 204 determines that the load location are the relative co-ordinates of the machine 100 at the stop X.

The controller 204 is coupled to an output device 208. The output device 208 may include a touchscreen, a monitor, a screen, or any other known output unit. The output device 208 is present inside the operator cabin 106 of the machine 100. Alternatively, the output device 208 may be present at the remote location. The controller 204 provides the operator with a notification of the load location relative to the worksite. Based on the signals received from the position detection system, the controller 204 is aware of the position of the machine 100 at different times. Further, through the analysis described above, the controller 204 determines the time interval and the distance traveled from the first dump location A at which the loading occurs. Hence, the controller 204 may determine the load location along the route 300. In one example, the load location is a GPS co-ordinate of the load location.

Further, the load location determined by the controller 204 may be stored in the database 206 and later used to build a site map of the worksite. Also, the load location and the start and end times of the loading operation may be further used to generate reports to track and monitor activities taking place at the worksite. For example, at the end of a shift of the machine 100 the controller 204 may report the load locations of all the loading operations performed by the machine 100.

Figure 5:
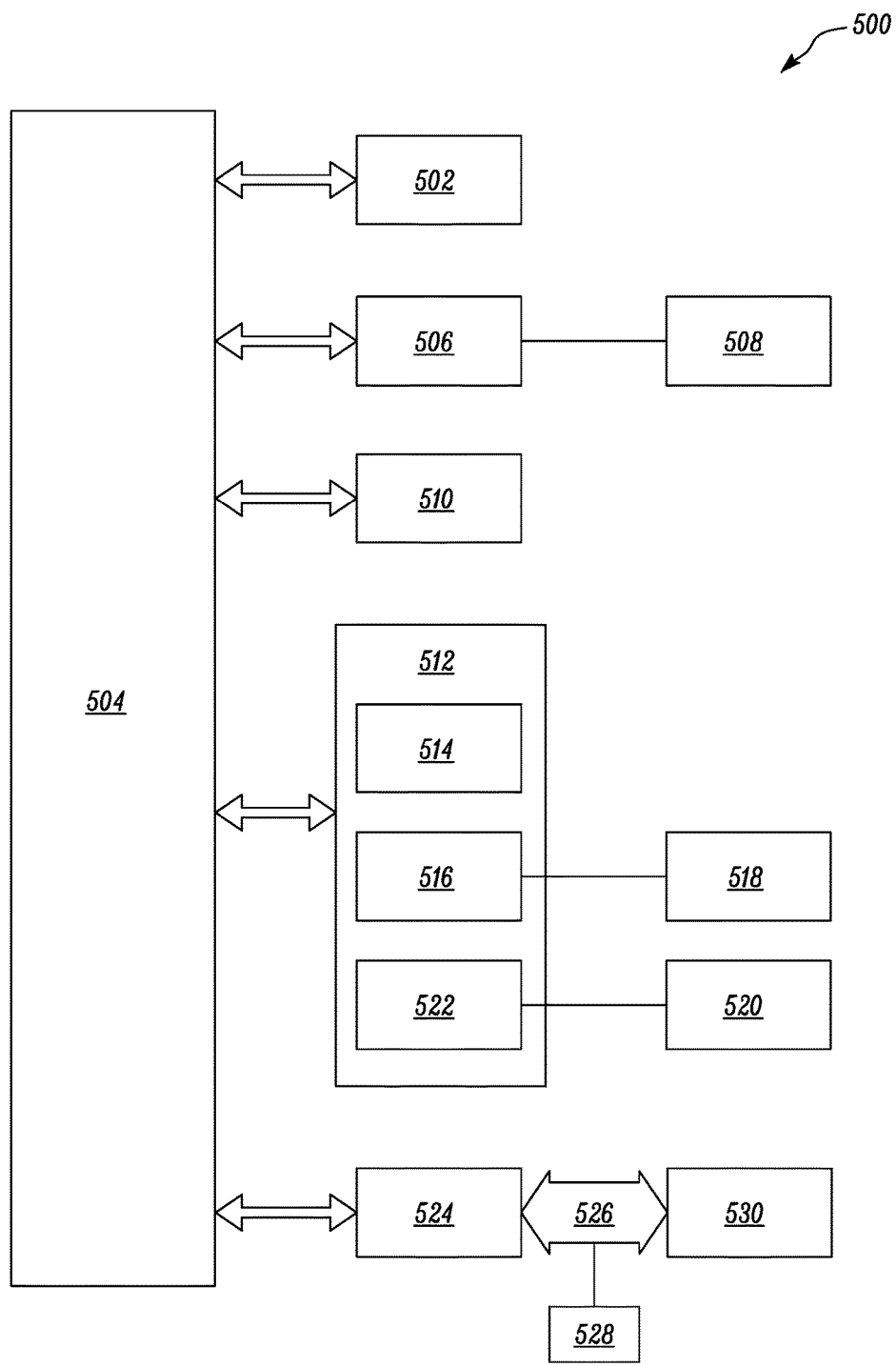
FIG. 5 is a schematic diagram of a low-level implementation of a computer-based system that can be configured to perform functions of the control system of FIG. 3, according to one embodiment of the present disclosure.

FIG. 5 is an exemplary low-level implementation of the control system 200 of FIG. 2 for determining the location of loading of the machine 100. The present disclosure has been described herein in terms of functional block components, modules, and various processing steps. It should be appreciated that such functional blocks may be realized by any number of hardware and/or software components configured to perform the specified functions. For example, a computer based system, hereinafter referred as system 500 may employ various integrated circuit components, e.g., memory elements, processing elements, logic elements, look-up tables, and/or the like, which may carry out a variety of functions under the control of one or more microprocessors or other control devices. Similarly, the software elements of the system 500 may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements.

Further, it should be noted that the system 500 may employ any number of conventional techniques for data transmission, signaling, data processing, network control, and/or the like. Still further, the system 500 could be configured to detect or prevent security issues with a user-side scripting language, such as JavaScript, VBScript or the like. In an embodiment of the present disclosure, the networking architecture between components of the system 500 may be implemented by way of a client-server architecture. In an additional embodiment of this disclosure, the client-server architecture may be built on a customizable.Net (dot-Net) platform. However, it may be apparent to a person ordinarily skilled in the art that various other software frameworks may be utilized to build the client-server architecture between components of the system 500 without departing from the spirit and scope of the disclosure.

These software elements may be loaded onto a general-purpose computer, special purpose computer, or other programmable data processing apparatus to produce a machine, such that the instructions that execute on the computer or other programmable data processing apparatus create means for implementing the functions disclosed herein. These computer program instructions may also be stored in a computer-readable memory that can direct a computer or other programmable data processing apparatus to function in a particular manner, such that the instructions stored in the computer-readable memory produce instructions which implement the functions disclosed herein. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions disclosed herein.

The present disclosure (i.e., system 200, system 500, method 600, any part(s) or function(s) thereof) may be implemented using hardware, software or a combination thereof, and may be implemented in one or more computer systems or other processing systems. However, the manipulations performed by the present disclosure were often referred to in terms such as detecting, determining, and the like, which are commonly associated with mental operations performed by a human operator. No such capability of a human operator is necessary, or desirable in most cases, in any of the operations described herein, which form a part of the present disclosure. Rather, the operations are machine operations. Useful machines for performing the operations in the present disclosure may include general-purpose digital computers or similar devices. In accordance with an embodiment of the present disclosure, the present disclosure is directed towards one or more computer systems capable of carrying out the functionality described herein. An example of the computer based system includes the system 500, which is shown by way of a block diagram in FIG. 5.

The system 500 includes at least one processor, such as a processor 502. The processor 502 may be connected to a communication infrastructure 504, for example, a communications bus, a cross-over bar, a network, and the like. Various software embodiments are described in terms of this exemplary system 500. Upon perusal of the present description, it will become apparent to a person skilled in the relevant art(s) how to implement the present disclosure using other computer systems and/or architectures. The system 500 includes a display interface 506 that forwards graphics, text, and other data from the communication infrastructure 504 for display on a display unit 508.

The system 500 further includes a main memory 510, such as random access memory (RAM), and may also include a secondary memory 512. The secondary memory 512 may further include, for example, a hard disk drive 514 and/or a removable storage drive 516, representing a floppy disk drive, a magnetic tape drive, an optical disk drive, etc. Removable storage drive 516 reads from and/or writes to a removable storage unit 518 in a well-known manner. The removable storage unit 518 may represent a floppy disk, magnetic tape or an optical disk, and may be read by and written to by the removable storage drive 516. As will be appreciated, the removable storage unit 518 includes a computer usable storage medium having stored therein, computer software and/or data.

In accordance with various embodiments of the present disclosure, the secondary memory 512 may include other similar devices for allowing computer programs or other instructions to be loaded into the system 500. Such devices may include, for example, a removable storage unit 520, and an interface 522. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit 520 to the system 500.

The system 500 may further include a communication interface 524. The communication interface 524 allows software and data to be transferred between the system 500 and external devices 530. Examples of the communication interface 524 include, but may not be limited to a modem, a network interface (such as an Ethernet card), a communications port, a Personal Computer Memory Card International Association (PCMCIA) slot and card, and the like. Software and data transferred via the communication interface 524 may be in the form of a plurality of signals, hereinafter referred to as signals 526, which may be electronic, electromagnetic, optical or other signals capable of being received by the communication interface 524. The signals 526 may be provided to the communication interface 524 via a communication path (e.g., channel) 528. The communication path 528 carries the signals 526 and may be implemented using wire or cable, fiber optics, a telephone line, a cellular link, a radio frequency (RF) link and other communication channels.

In this document, the terms "computer program medium" and "computer usable medium" are used to generally refer to media such as the removable storage drive 516, a hard disk installed in the hard disk drive 514, the signals 526, and the like. These computer program products provide software to the system 500. The present disclosure is also directed to such computer program products.

The computer programs (also referred to as computer control logic) may be stored in the main memory 510 and/or the secondary memory 512. The computer programs may also be received via the communication interface 504. Such computer programs, when executed, enable the system 500 to perform the functions consistent with the present disclosure, as discussed herein. In particular, the computer programs, when executed, enable the processor 502 to perform the features of the present disclosure. Accordingly, such computer programs represent controllers of the system 500.

In accordance with an embodiment of the present disclosure, where the disclosure is implemented using a software, the software may be stored in a computer program product and loaded into the system 500 using the removable storage drive 516, the hard disk drive 514 or the communication interface 524. The control logic (software), when executed by the processor 502, causes the processor 502 to perform the functions of the present disclosure as described herein.

In another embodiment, the present disclosure is implemented primarily in hardware using, for example, hardware components such as application specific integrated circuits (ASIC). Implementation of the hardware state machine so as to perform the functions described herein will be apparent to persons skilled in the relevant art(s). In yet another embodiment, the present disclosure is implemented using a combination of both the hardware and the software.

Various embodiments disclosed herein are to be taken in the illustrative and explanatory sense, and should in no way be construed as limiting of the present disclosure. All numerical terms, such as, but not limited to, "first", "second", "third", or any other ordinary and/or numerical terms, should also be taken only as identifiers, to assist the reader's understanding of the various embodiments, variations, components, and/or modifications of the present disclosure, and may not create any limitations, particularly as to the order, or preference, of any embodiment, variation, component and/or modification relative to, or over, another embodiment, variation, component and/or modification.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

Figure 6:
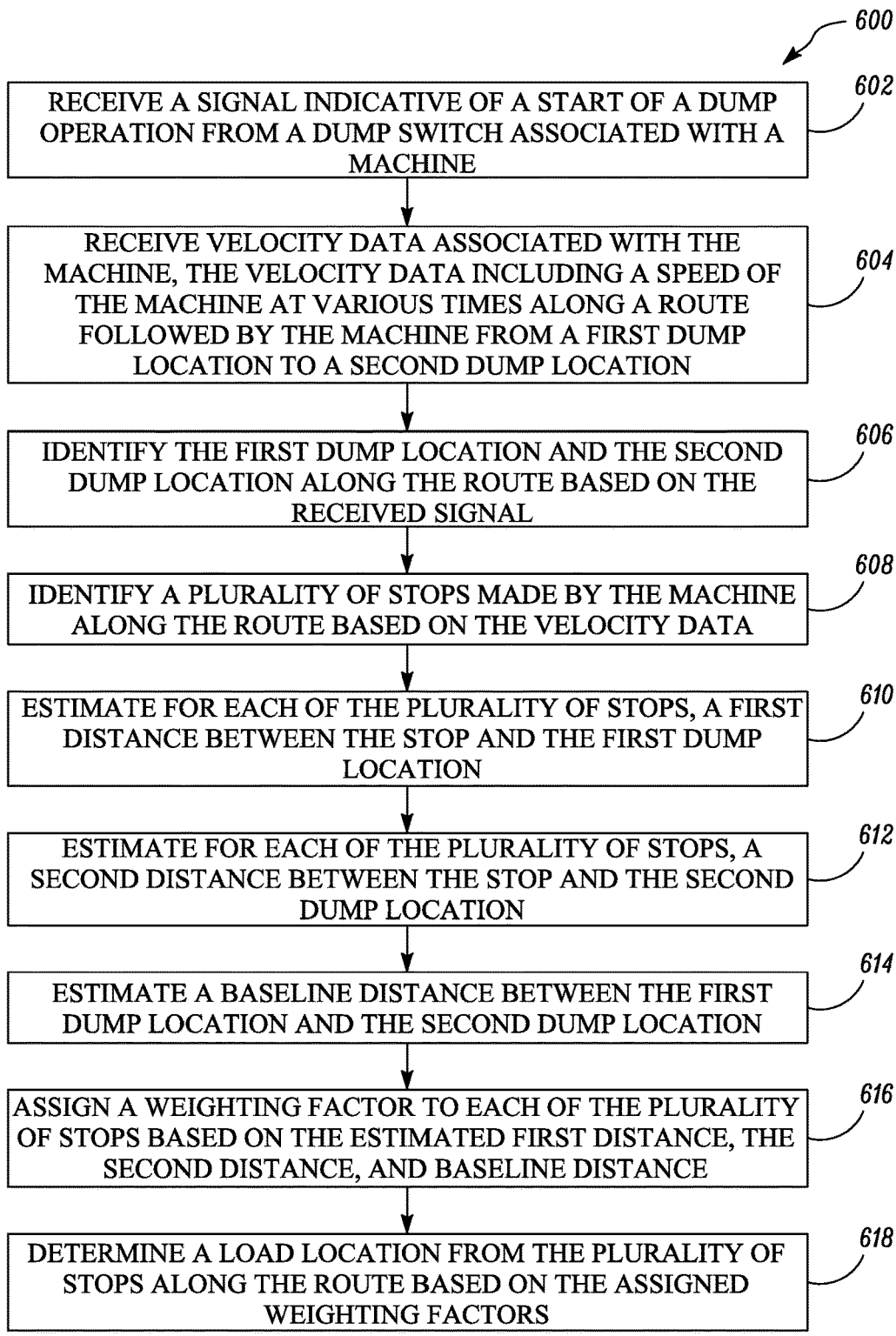
FIG. 6 is a flowchart of a method for determining a location of loading of the machine operating at the worksite, according to one embodiment of the present disclosure.

The present disclosure relates to the system and method for determination of the load location at the worksite. Referring to FIG. 6, at step 602 the controller 204 receives the dump signal indicative of the start of the dump operation from the dump switch 202 associated with the machine 100. At step 604, the controller 204 receives the velocity data associated with the machine 100. The velocity data includes the speed of the machine 100 at various positions along the route from the first dump location to the second dump location. At step 606, the controller 204 identifies the first dump location and the second dump location along the route based on the received dump signal. At step 608, the controller 204 identifies the stops made by the machine 100 along the route based on the velocity data.

At step 610, the controller 204 estimates, for each of the stops, the first distance between the stop and the first dump location. At step 612, the controller 204 estimates, for each of the stops, the second distance between the stop and the second dump location. At step 614, the controller 204 estimates the baseline distance between the first dump location and the second dump location. At step 616, the controller 204 assigns the weighting factor to each of the stops based on the estimated first distance, the second distance, and baseline distance. Further, at step 618, the controller 204 determines the load location from the stops made along the route based on the assigned weighting factors.

The system provides a robust and cost-effective solution for determining the stop that is made for loading out of the multiple stops made by the machine 100 along the route. The system does not require the installation of additional hardware or expensive sensors. Further, the system determines the location of loading and the start and end times of the loading operation, allowing detailed reports to be generated for production and evaluation purposes. The system provides a reliable output for detection of the load location in situations in which the machine 100 moves from one dump location to another dump location, and even when the machine 100 starts from one dump location and returns to the same dump location.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A control system for determining a location of loading of a machine operating at a worksite, the control system comprising:
    a dump switch associated with the machine, the dump switch configured to generate a dump signal indicative of a start of a dump operation; and
    a controller coupled to the dump switch, the controller configured to:
        receive the dump signal indicative of the start of the dump operation;
        receive velocity data associated with the machine, the velocity data including a speed of the machine at various positions along a route followed by the machine from a first dump location to a second dump location;
        identify the first dump location and the second dump location along the route based on the received dump signal;
        identify a plurality of stops made by the machine along the route based on the velocity data;
        estimate, for each of the plurality of stops, a first distance between the stop and the first dump location;
        estimate, for each of the plurality of stops, a second distance between the stop and the second dump location;
        estimate a baseline distance between the first dump location and the second dump location;
        assign a weighting factor to each of the plurality of stops based on the estimated first distance, the second distance, and baseline distance; and
        determine a load location from the plurality of stops along the route based on the assigned weighting factors.

2. The control system of claim 1, wherein the controller is further configured to determine a probability of a loading operation of the machine at each of the plurality of stops based on the assigned weighting factor.

3. The control system of claim 1, wherein controller is configured to assign the weighting factor to each of the plurality of stops based on a closeness of the given stop to the baseline distance.

4. The control system of claim 3, wherein the controller assigns the weighting factor having a higher value if the given stop is closer to the baseline distance.

5. The control system of claim 1, wherein the controller is configured to identify each of the plurality of stops made by the machine based on identification of the speed of the machine dropping below a predetermined threshold.

6. The control system of claim 1, wherein the controller is coupled to an output device, and wherein the controller is configured to provide a notification of the determined load location through the output device.

7. The control system of claim 1, wherein the determined load location is further used to build a site map of the worksite.

8. The control system of claim 1, wherein the controller is configured to provide a report including a plurality of the determined load locations at an end of a shift of the machine.

9. The control system of claim 1, wherein the dump switch is present on-board the machine, and wherein the dump switch is activated at the start of the dump operation.

10. The control system of claim 1, wherein the velocity reports include GPS doppler velocity reports.

11. The control system of claim 1, wherein the controller is configured to determine the load location after completion of a dump-load-dump cycle.

12. The control system of claim 1, wherein the determined load location is a GPS co-ordinate of machine at the worksite at which the machine is loaded.

13. A method for determining a location of loading of a machine operating at a worksite, the method comprising:
    receiving, by a controller, a dump signal indicative of a start of a dump operation from a dump switch associated with the machine;
    receiving, by the controller, velocity data associated with the machine, the velocity data including a speed of the machine at various positions along a route followed by the machine from a first dump location to a second dump location;
    identifying, by the controller, the first dump location and the second dump location along the route based on the received dump signal;
    identifying, by the controller, a plurality of stops made by the machine along the route based on the velocity data;
    estimating, by the controller, for each of the plurality of stops, a first distance between the stop and the first dump location;
    estimating, by the controller, for each of the plurality of stops, a second distance between the stop and the second dump location;
    estimating, by the controller, a baseline distance between the first dump location and the second dump location;
    assigning, by the controller, a weighting factor to each of the plurality of stops based on the estimated first distance, the second distance, and baseline distance; and
    determining, by the controller, a load location from the plurality of stops along the route based on the assigned weighting factors.

14. The method of claim 13 further comprising determining a probability of a loading operation of the machine at each of the plurality of stops based on the assigned weighting factor.

15. The method of claim 13, wherein the assigning step includes assigning the weighting factor to each of the plurality of stops based on a closeness of the given stop to the baseline distance.

16. The method of claim 15, wherein the weighting factor is of a higher value if the given stop is closer to the baseline distance.

17. The method of claim 13, wherein the identification of each of the plurality of stops step includes identifying when the speed of the machine drops below a predetermined threshold.

18. The method of claim 13 further comprising providing, by the controller, a notification of the determined load location through an output device.

19. The method of claim 13 further comprising building a site map of the worksite based on the determined load location.

20. A non-transitory computer program product having computer-executable instructions stored thereon that, if executed by a computer based system capable of determining a location of loading of a machine operating at a worksite, causes the computer based system to be capable of performing operations comprising:
receiving, by a controller, a dump signal indicative of a start of a dump operation from a dump switch associated with the machine;
receiving, by the controller, velocity data associated with the machine, the velocity data including a speed of the machine at various positions along a route followed by the machine from a first dump location to a second dump location;
identifying, by the controller, the first dump location and the second dump location along the route based on the received dump signal;
identifying, by the controller, a plurality of stops made by the machine along the route based on the velocity data;
estimating, by the controller, for each of the plurality of stops, a first distance between the stop and the first dump location;
estimating, by the controller, for each of the plurality of stops, a second distance between the stop and the second dump location;
estimating, by the controller, a baseline distance between the first dump location and the second dump location;
assigning, by the controller, a weighting factor to each of the plurality of stops based on the estimated first distance, the second distance, and baseline distance; and
determining, by the controller, a load location from the plurality of stops along the route based on the assigned weighting factors.

* * * * *